Figure 1:
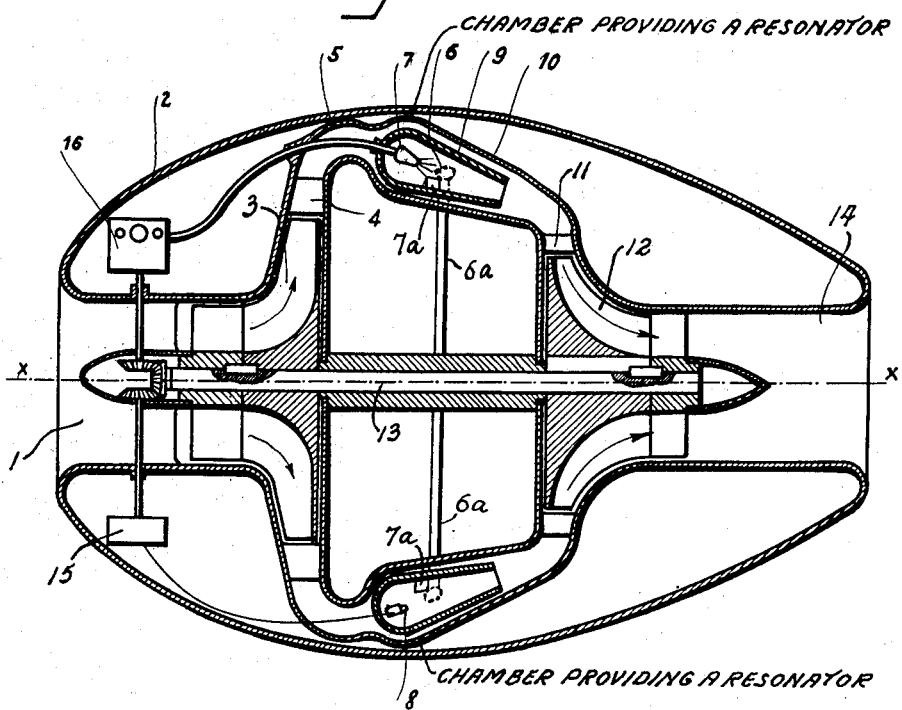

April 22, 1952

L. A. J. BAUGER 2,593,523

GAS TURBINE ENGINE WITH RESONATING
COMBUSTION CHAMBERS

Filed May 2, 1949

2 SHEETS—SHEET 1

INVENTOR
Louis A. J. Bauger
By Watson, Cole, Grindle & Watson
ATTYS

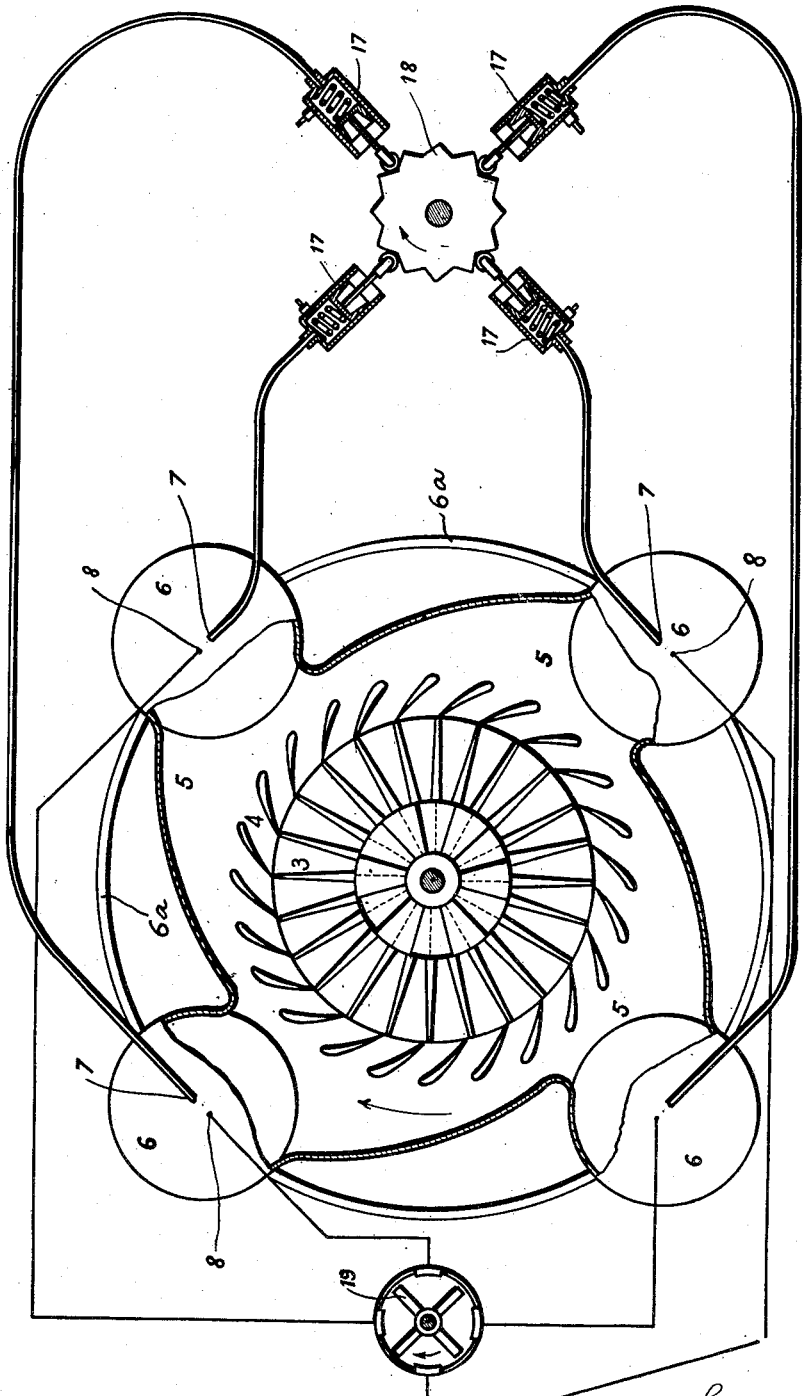

Patented Apr. 22, 1952

2,593,523

UNITED STATES PATENT OFFICE 2,593,523

GAS TURBINE ENGINE WITH RESONATING COMBUSTION CHAMBERS

Louis A. J. Bauger, Vanves, France, assignor to Société Nationale d'Etude et de Construction de Moteurs d'Aviation, Paris, France, a company of France Application May 2, 1949, Serial No. 90,835
In France May 5, 1948

2 Claims. (Cl. 60—39.75)

In already known gas turbine plants a compressor is necessary for obtaining the working cycle. Whatever be the type of this compressor, axial or centrifugal, the thermal engine is designed for using, at the outlet of the compressor, a flow of fluid having a continuous average pressure.

In fact, because of the limited number of the rotor's and stator's blades of the compressor, the fluid flow has a pulsatory nature, that is, its instantaneous pressure oscillates around the average pressure which is usually observed in the vessel into which the compressor delivers. The fewer the number of blades of the compressor, the more marked is this nature. Incidentally that explains that the phenomenon is more marked in centrifugal compressors than in axial compressors. And there is, in all cases, the result that the known turbines, computed and built for a non-pulsatory flow of fluid, work in fact through a pulsatory flow, which gives losses heavily damaging the yield of the plant.

My invention relates to a gas turbine engine able to use the instantaneous energy of the fluid and to extract from it the maximum available energy.

This is obtained through using the variations of the fluid pressure around the average value and amplifying them in such a manner that the turbine does not work through the average pressure provided by the compressor but through the instantaneous pressure of the fluid which is appreciably higher.

Such a gas turbine engine does not work according to the constant pressure cycle, but according to a constant volume cycle in which it is possible to obtain high instantaneous combustion pressures by means of a compressor giving usual average pressures.

This engine enables to use the maximum energy contained in the fluid at the outlet of the compressor. As a result an appreciably higher power-to-weight ratio is obtained and also a better efficiency and consequently an appreciably lower specific fluid consumption.

This engine comprises, as the known engines using a continuous flow, three main parts: the compressor, the combustion chamber or chambers and the turbine.

The compressor is of a type systematically increasing the puslatory nature of the flow, preferably of the centrifugal type delivering the required mass of fluid at a given frequency, which is a function of the speed of revolution and of the number of blades of its rotor. The delivered mass is defined as a function of the specific mass of the fluid computed with the average values of the pressure and temperature of the pulsatory flow. The computation of the whole engine will be based on these effective average values.

The compressor may be provided with a diffuser whose number of blades is equal to the number of combustion chambers or a multiple of the latter.

The pulsatory fluid delivered by the compressor is sent to the combustion chamber or chambers.

This chamber is made as a resonator in such a manner that its usual frequency of vibrations is equal to the frequency of the pulsations of the fluid passing through it.

At the stable working rate of the engine, there will be a tuning between the pulsations of the fluid coming from the compressor and the pulsations of the fluid contained in the combustion chamber or chambers. An amplification of the variations of pressure will be produced in the latter, which will be a function of the synchronizing factor of the resonators which the chambers constitute.

The turbine receiving the amplified pulsatory flow should be adapted to efficiently use that flow.

It is convenient to design it as a centrifugal (inverted) compressor, in such a manner that the centripetal flow of the gas through that turbine has naturally a pulsatory character analogous to that of the air in the centrifugal compressor. In fact this centrifugal compressor is a reversing machine, and consequently the gases distributed into its rotor through a distributor analogous to the diffuser of a centrifugal compressor expand in this distributor, and act in the rotor, producing the motive power while keeping their pulsatory character.

If it is thus designed, the turbine will be able to use with an excellent efficiency the pulsations of the fluid flow which will pass through it.

With such a turbine, and reasoning in an analogous way as in the case of a centrifugal compressor, it is possible to expect a ratio of expansion equal to 4, and a thermal efficiency included between 80 and 85%.

The pulsations of the air at the outlet of the compressor and these of the hot gases leaving the combustion chambers having a same frequency, the two machines, compressor and turbine will be coupled together in such a manner that the own frequency of the turbine is in synchronism with that of the gases.

Conveniently the ignition or the fuel injection in the chamber or chambers, or both these factors, will be of an intermittent nature at the frequency of the pulsating fluid flow in order to still amplify the amplitude of the pressure pulsations by means of a phenomenon analogous to the synchronous excitation of a pendular motion.

It will thus be possible to carry out the ignition by means of the periodical sparks of plugs, in order to start the combustion which will then normally proceed.

The fuel injection may be secured through a powerful pump injecting the required quantity of fuel in synchronism with the pressure variations in the chamber.

At the very moment the pressure in the chamber reaches its maximum value, the fuel will be injected and ignited.

In the case of several combustion chambers connected together, a spark plug may be arranged in only one of them.

Each chamber will have a fuel injector.

The fuel injecting pump will be for instance of the piston type, analogous to that used in the piston engines having a fuel injection in the cylinders, differing in that the fuel will be simultaneously injected in all combustion chambers. The pump will be provided with a complete adjusting system according to the different factors defining the proportioning of the fuel (temperature, pressure, air flow), each stroke of the pump injecting the required quantity of fuel.

With such an arrangement, the oscillation of the pressure in the combustion chamber is the result of three causes:

The initial, more or less marked, pulsation of the flow of the compressor,

A mechanical factor dependent on the geometrical shapes and dimensions of the combustion chamber which define in a vibratory working the synchronizing factor.

A thermal cause dependent on the pulsation of the combustion in the chamber.

A gas turbine engine according to the invention may be used in the most varied practical applications either for driving various driven engines, or for feeding at the outlet of the turbine a jet propulsion nozzle in which the gases continue to expand.

A few turbines and compressors may of course be coupled in a same set, series connected or arranged in parallel in the gases flow according to the varied arrangements which are well known and are not part of my invention.

Other objects and advantages of the invention will be apparent during the course of the following description. In the accompanying drawing forming a part of this application and in which like numerals are employed to designate like parts throughout the same, Figure 1 is an axial section of an embodiment of the engine according to the invention, Figure 2 is a diagrammatic enlarged transverse section of this engine through the compressor's rotor. In this figure the ignition distributor and the injection pump are shown on scales entirely different from the scale of the other parts of the engine.

In the engine shown in the figures, the air (relative wind) entering the front opening 1 of a fairing 2 is compressed through the rotor 3 of a centrifugal compressor. The air passes then into a diffuser 4, which meets the already mentioned condition and is used for recuperating the greatest part of the kinetic energy of the gases, while keeping the pulsatory nature of the flow. The compressed air thus provided feeds, through ducts 5, combustion chambers 6 arranged according to a cylinder having for its axis the axis $x$—$x$ of the whole system. Said chambers may be connected together by means of a circular pipe 6a arranged in a plane perpendicular to the axis $x$—$x$.

Each one of these chambers is provided with a fuel injector 7, a plug 8 and may have, as it is already known, a double wall, the internal wall 9 being used for the combustion itself and the annular space between this wall 9 and the external wall 10 being used for letting pass the diluted air which is mixed with the flow of gases at the outlet of the chamber.

Finally the generated gases pass through the distributor 11 of a centripetal turbine whose rotor is seen at 12. As the number of blades of this distributor is equal to the number of chambers or a multiple of said number, the air flow keeps its pulsatory nature. The first expansion of the gases in the centripetal turbine provides the power necessary for driving the compressor 3 whose rotor is keyed on the same shaft 13 as that of the turbine. The gases leaving the turbine are finally expanded in the jet propulsion nozzle 14.

As it has been above explained, the pulsation of the fluid flow under pressure provided by the compressor's rotor 3 in the combustion chambers is dependent on the number of blades of said rotor and of its speed of revolution. For a given working rate of the engine, the frequency of this pulsation is thus well defined.

Each combustion chamber has an elongated shape and dimensions according to the well known laws of pipe resonance in order to form a resonator for the above frequency. It is known that the frequency of a vibrating pipe is a function of the length of said pipe. In the present case it is easy to determine either by calculation or by experiments, the length of the combustion chambers so that said chambers have a frequency corresponding to that of the pulsations of the air delivered by the compressor. Furthermore the centripetal turbine 12, which is in a way the compressor which has been inverted, would correspond, if it was used as a compressor, to a certain frequency of the pulsatory flow which it would then provide. It is obvious that this frequency should be equal to the frequency provided by the compressor 3. In the shown example the rotors of both machines are keyed on the same shaft.

The extent of the pulsation in the combustion chambers may still be increased through one of the means which have been described. For instance in the drawing each one of the injectors 7 provided in the chambers is fed through an injection pump 17 operated by means of a cam 18 which is common to all the pumps feeding the chambers of the machine. This cam is designed in order to cause the injection of the fuel into the chambers only at predetermined moments whose frequency is equal to that of the pulsation of gases in the combustion chambers and which correspond to a maximum pressure under the tuning action. Of course these injections may be shifted with respect to the maximum pressures according to the adjustment which will be experimentally obtained.

The ignition may occur at the same moments by means of plugs 8 receiving from a magneto, not shown, a high tension intermittent current, for instance through a distributor 19 (which, in the shown example, is supposed to rotate three times faster than the cam 18). But it is possible not to use an electric ignition after the starting because in the chambers at high temperature the fuel jet injected by each injector will be immediately ignited thus producing a kind of lightning, and a sudden increase of the temperature and pressure, producing the excitation of the pulsation. Occasionally, a hot piece 7a may be provided at the nose of each injector, according to a known principle.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a gas turbine plant adapted to operate according to a cycle at variable pressure but constant volume, a source of air under pulsating pressure comprising a centrifugal compressor having a centrifugal wheel with movable blades and a diffuser with stationary blades arranged downstream with respect to said wheel and adapted to transform into pressure the kinetic energy of the whole air output issuing from said movable blades, a pulsating source of hot gases including at least one combustion chamber fed with air under pulsating pressure from said diffuser for supporting combustion in said chamber, said chamber having an elongated form with dimensions adapted to give the chamber a resonance frequency tuned to the frequency of said pulsating pressure, fuel injecting means delivering fuel into said chamber, and control means for operating periodically said fuel injecting means at the frequency of said pulsating pressure, a gas turbine of the variable-pressure operated type the intake of which has stationary expansion nozzles freely opened and connected to the said hot-gas source, and coupling means between said gas turbine and said centrifugal compressor adapted to drive it.

2. A gas turbine plant according to claim 1 wherein the gas turbine including its stationary intake nozzles and movable wheel is similar in design to the centrifugal compressor and is adapted to operate centripetally, whereby the gas expands through said stationary nozzles and movable wheel at a frequency equal to that of the air pressure produced by said compressor.

LOUIS A. J. BAUGER.

REFERENCES CITED

The following references are of record in the file of this patent:

UNITED STATES PATENTS

| Number | Name | Date |
|---|---|---|
| 2,477,683 | Birmann | Aug. 2, 1949 |
| 2,480,626 | Bodine | Aug. 30, 1949 |